(12) United States Patent
Kennedy et al.

(10) Patent No.: US 10,465,595 B2
(45) Date of Patent: Nov. 5, 2019

(54) METHOD OF REMOVAL OF ENGINE EXHAUST FROM A WORK MACHINE AND SYSTEM THEREOF

(71) Applicant: DEERE & COMPANY, Moline, IL (US)

(72) Inventors: Thomas Kennedy, Platteville, WI (US); Kevin W. Campbell, Dubuque, IA (US); Paul A. Wantschik, Platteville, WI (US); Travis Graber, Farley, IA (US); Kal J. Airey, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/949,498

(22) Filed: Apr. 10, 2018

(65) Prior Publication Data
US 2019/0309673 A1  Oct. 10, 2019

(51) Int. Cl.
*F01P 11/10* (2006.01)
*F15B 21/042* (2019.01)
*F01N 3/021* (2006.01)
*F01N 3/08* (2006.01)
*F01N 3/02* (2006.01)

(52) U.S. Cl.
CPC .............. *F01P 11/10* (2013.01); *F01N 3/021* (2013.01); *F01N 3/0205* (2013.01); *F01N 3/08* (2013.01); *F15B 21/042* (2013.01)

(58) Field of Classification Search
CPC ....... B60K 11/04; B60K 13/04; F01N 13/082; F01N 2260/022; F01N 2270/02; F01N 2590/08; F01P 11/10; F01P 2001/005
See application file for complete search history.

(56) References Cited

U.S. PATENT DOCUMENTS 2,927,422 A   3/1960 Shaffer et al.
4,854,278 A   8/1989 Honecker
(Continued)

FOREIGN PATENT DOCUMENTS

EP   0313763 A1   5/1989
JP   08312335 A  * 11/1996

OTHER PUBLICATIONS

Machine translation of JP-08312335-A, accessed on Mar. 28, 2019. (Year: 2019).*

*Primary Examiner* — Jonathan R Matthias
(74) *Attorney, Agent, or Firm* — Taft Stettinius & Hollister LLP; Stephen F. Rost

(57) ABSTRACT

An apparatus and method of cooling an engine exhaust generated by an engine of a work machine having a hydraulically operated implement. The work machine includes an emission control system and a cooling system having an oil cooling system configured to cool an oil of a hydraulic system and an engine cooling system configured to cool an engine coolant circulating through the engine. An exhaust pipe, coupled to the emission control system and configured to direct engine exhaust, includes an outlet disposed in a space located between an oil cooler of the oil cooling system and a radiator of the engine cooling system. An air displacement device is configured to draw air into and away from the oil cooler and the radiator and to draw the exhaust from the exhaust pipe. Exhaust from the exhaust pipe is drawn past the oil cooler and the radiator to cool the exhaust.

19 Claims, 5 Drawing Sheets

(56) References Cited

U.S. PATENT DOCUMENTS

| | | |
|---|---|---|
| 7,204,329 B2 | 4/2007 | Pfohl et al. |
| 2005/0022521 A1 | 2/2005 | Patry |
| 2010/0132347 A1* | 6/2010 | Ikeda ..................... E02F 9/00 60/320 |
| 2011/0277961 A1 | 11/2011 | Knepper et al. |

* cited by examiner

METHOD OF REMOVAL OF ENGINE EXHAUST FROM A WORK MACHINE AND SYSTEM THEREOF

FIELD OF THE DISCLOSURE

The present disclosure relates to a work machine, and in particular, to a method of removal of engine exhaust from the work machine and a system thereof.

BACKGROUND OF THE DISCLOSURE

Many work machines, such as a front loader, include one or more implements capable of performing a work function. A front loader includes a prime mover which generates power to perform work, a shaft power conversion machine, and reversible energy storage. In the case of a four wheel drive loader, for instance, the prime mover is often a diesel engine that generates power from a supply of diesel fuel. The diesel engine drives a transmission which moves a ground engaging traction device, such as wheels or treads, to propel the loader, in some situation, across unimproved ground for use in construction. Such loaders include a hydraulic machine having a hydraulic pump which can be used for instance, to raise or lower a piece of equipment such as a bucket. The bucket is coupled to a boom that raises or lowers the bucket to perform a digging function or to move material from one location to another.

Front loaders are typically operated off-road and include construction vehicles, forestry vehicles, and lawn maintenance vehicles. Front loaders are also operated as on-road vehicles such as those used to plow snow, spread salt, or vehicles with towing capability. Each of the work vehicles typically include combustion engines as the prime mover which generate an exhaust that includes environmental contaminants that require removal or at least a reduction in quantity before being released to the atmosphere. The exhaust released to the atmosphere is at a high temperature which can irritate an operator of the vehicle, depending on the direction of the exhaust travels after being released. The high temperature exhaust can also damage surrounding vegetation such as overhanging tree limbs. In addition, the exhaust is typically directed by an exhaust stack that extends vertically from the vehicle and is prone to damage. Consequently, what is needed therefore is an exhaust system that directs the exhaust away from the vehicle at a predetermined location to reduce or prevent the detrimental effects of the high temperature exhaust.

SUMMARY

In one embodiment, there is provided a work machine including an implement and a hydraulic system configured to power the implement. The work machine includes an engine configured to provide power and to generate an exhaust as a result thereof and an oil cooling system configured to cool an oil of the hydraulic system. An engine cooling system is configured to cool an engine coolant circulating through the engine. An exhaust system is operatively connected to the engine wherein the exhaust system is configured to reduce contaminants located in the exhaust. The exhaust system includes an exhaust pipe configured to direct the exhaust, wherein the exhaust pipe is located adjacent to one of the oil cooling system and the engine cooling system. An air displacement device is configured to draw air into and away from one of the oil cooling system and the engine cooling system and to draw the exhaust from the exhaust pipe.

In another embodiment, there is provided an emission control system for an off-road vehicle including a cooling system having an oil cooling system configured to cool an oil of a hydraulic system and an engine cooling system configured to cool an engine coolant circulating through the engine. The emission control system includes an emission control device configured to reduce contaminants from an engine exhaust. The emission control device includes at least one of a selective catalytic reduction device, a diesel oxidation catalyst device, a diesel particulate filter device, and a cooled exhaust gas recirculation device. An exhaust pipe is operatively connected to and extends from the emission control device and is configured to direct exhaust. The exhaust pipe includes an outlet located adjacent to one of the oil cooling system and the engine cooling system.

In a further embodiment, there is provided a method of cooling engine exhaust generated by an engine of a work machine having a hydraulically operated implement. The method includes: cooling an oil used by the hydraulically operated implement with an oil cooler; cooling an engine coolant circulating through the engine with a radiator; directing the engine exhaust adjacent to one of the oil cooler and the radiator; and drawing the engine exhaust away from one of the oil cooler and the radiator with an air displacement device.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
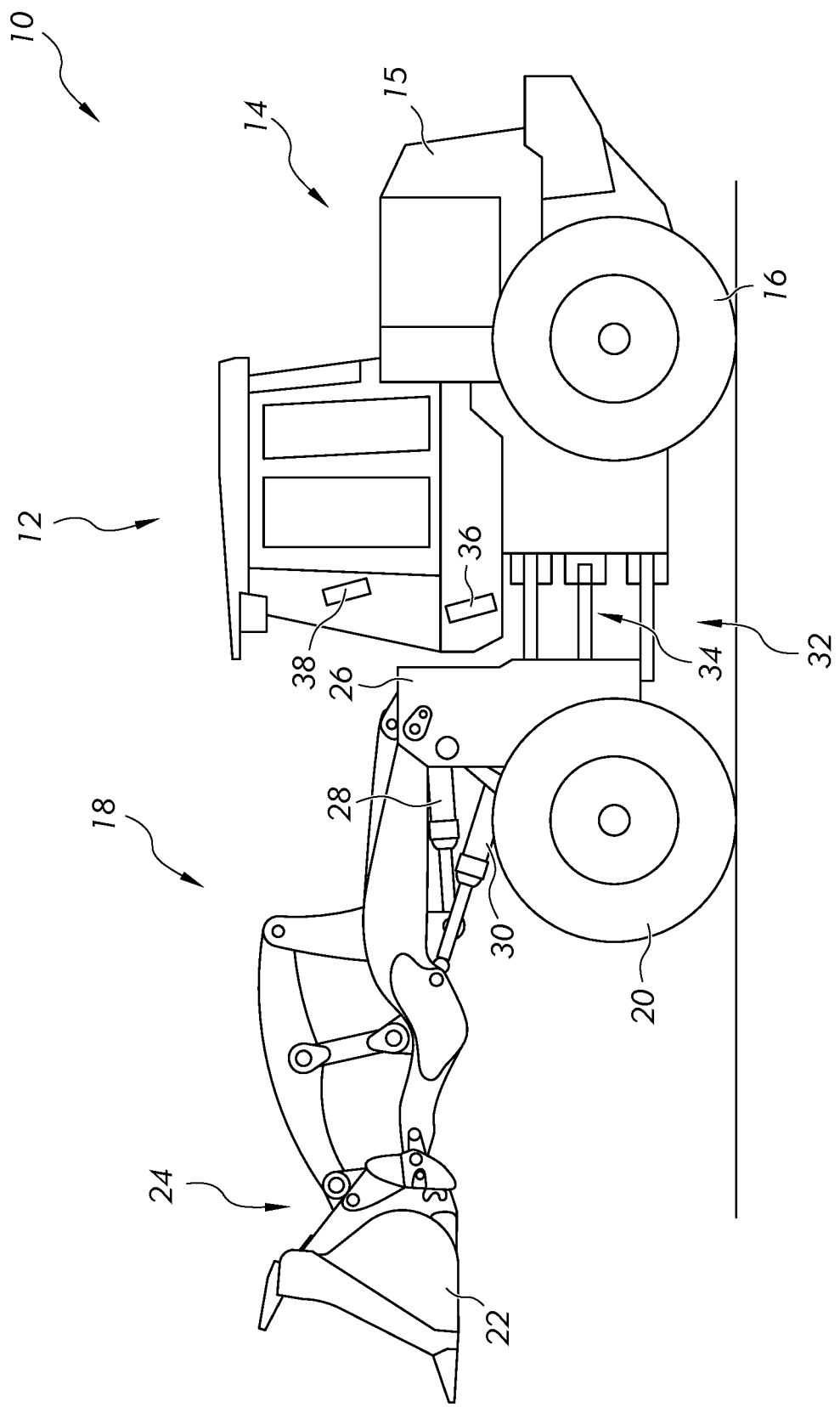
FIG. 1 is an elevational side view of a work machine.

An example embodiment of a work machine is shown in FIG. 1. The machine is illustrated as a front loader 100 such as a four-wheel drive loader. The present disclosure is not limited, however, to a loader and may extend to other work machines such as an excavator, a backhoe loader, crawler, harvester, skidder, motor grader, or any other work machine. As such, while the figures and forthcoming description may relate to a loader, it is to be understood that the scope of the present disclosure extends beyond a loader and, where applicable, the term "machine" or "work machine" will be used instead. The term "machine" or "work machine" is intended to be broader and encompass other vehicles besides a loader for purposes of this disclosure.

FIG. 1 is a side elevational view of a work vehicle 10. The work vehicle 10 is a four wheel drive (4WD) loader having: a cab 12 and a rear body portion 14 includes an engine (see FIG. 2 for instance) enclosed by a housing 15. The rear body portion 14 includes rear wheels 16. A front body portion 18 includes front wheels 20, and support a bucket 22. A linkage 24 is coupled to a frame 26 of the front body portion 18 to adjust a position of the bucket 22 with respect to the frame 26. Hydraulic cylinders 28 and 30 move the linkage 24 under control an operator located in the cab 12. An articulation joint 32 enables an angular change between the front body portion 18 and the rear body portion 14. One or more hydraulic cylinders 34 adjust the angular position between the front and rear body portions 18 and 14 under hydraulic power provided by hydraulic pumps (not shown). The hydraulic pumps are part of a hydraulic system that provides the power to move the linkage 24 and which includes an oil cooler to reduce the temperature of the oil resulting from the work performed. In one or more embodiments, ground engaging traction devices, such as tracks, are used in place of the wheels 16 and/or 20. The present application is not limited to a 4WD loaders and other types of vehicles are contemplated, including excavators, skid steers, and other loaders including two wheel drives and tracks.

An accelerator pedal 36 and a user interface 38 are located within the cab 12 for use by the operator of the vehicle 10. The accelerator pedal 37 enables the operator to adjust the speed of the vehicle. In other embodiments, a hand lever provides this function.

The user interface 38 includes a plurality of operator selectable buttons configured to enable the operator to control the operation and function of the vehicle 1 and any accessories or implements being driven by the powertrain of the vehicle, including power take off. The user interface 38, in one embodiment, includes a user interface screen having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons.

Figure 2:
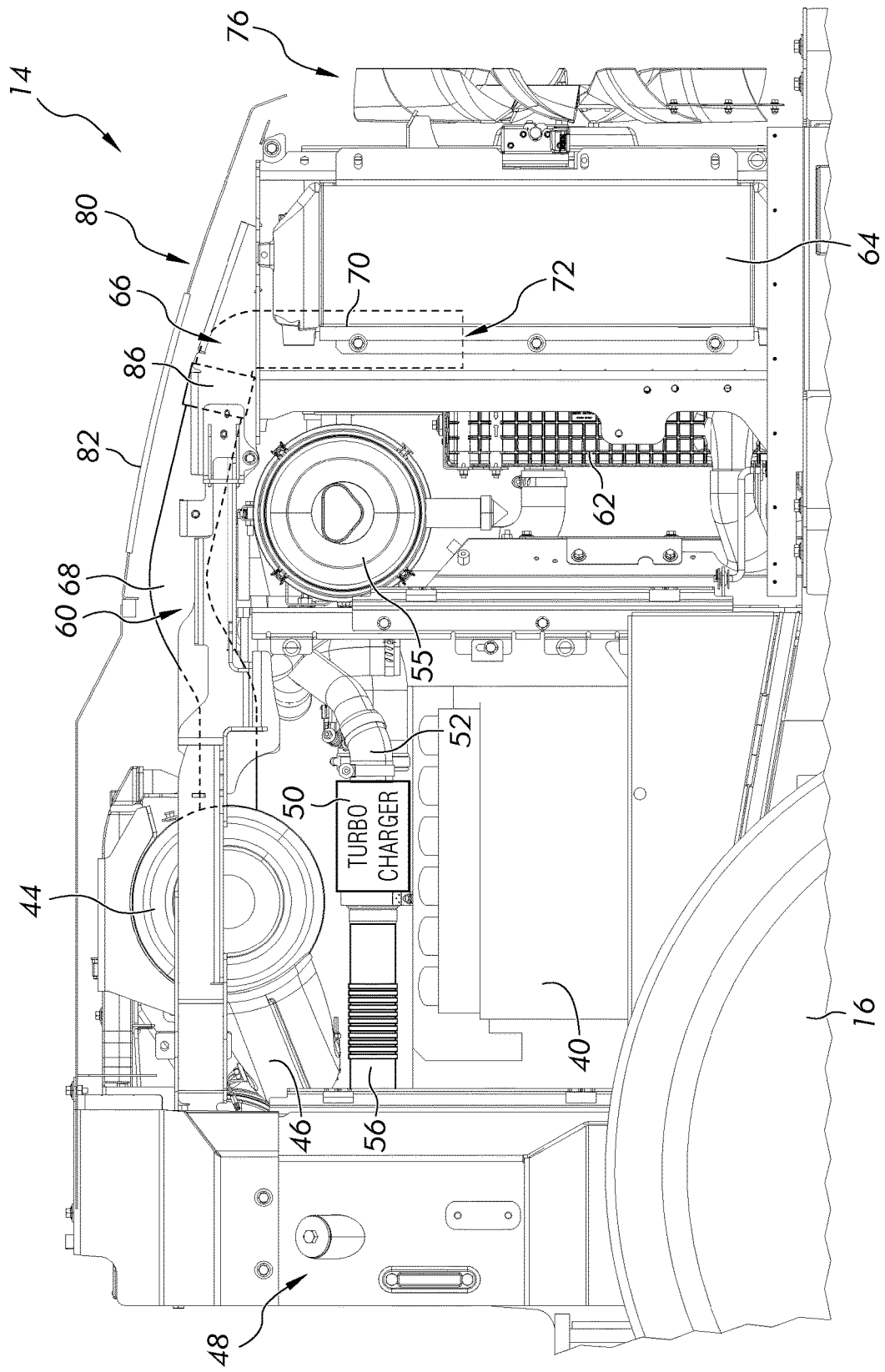
FIG. 2 is a schematic side view of a rear portion of a work machine illustrating a location of an exhaust pipe.
Figure 3:
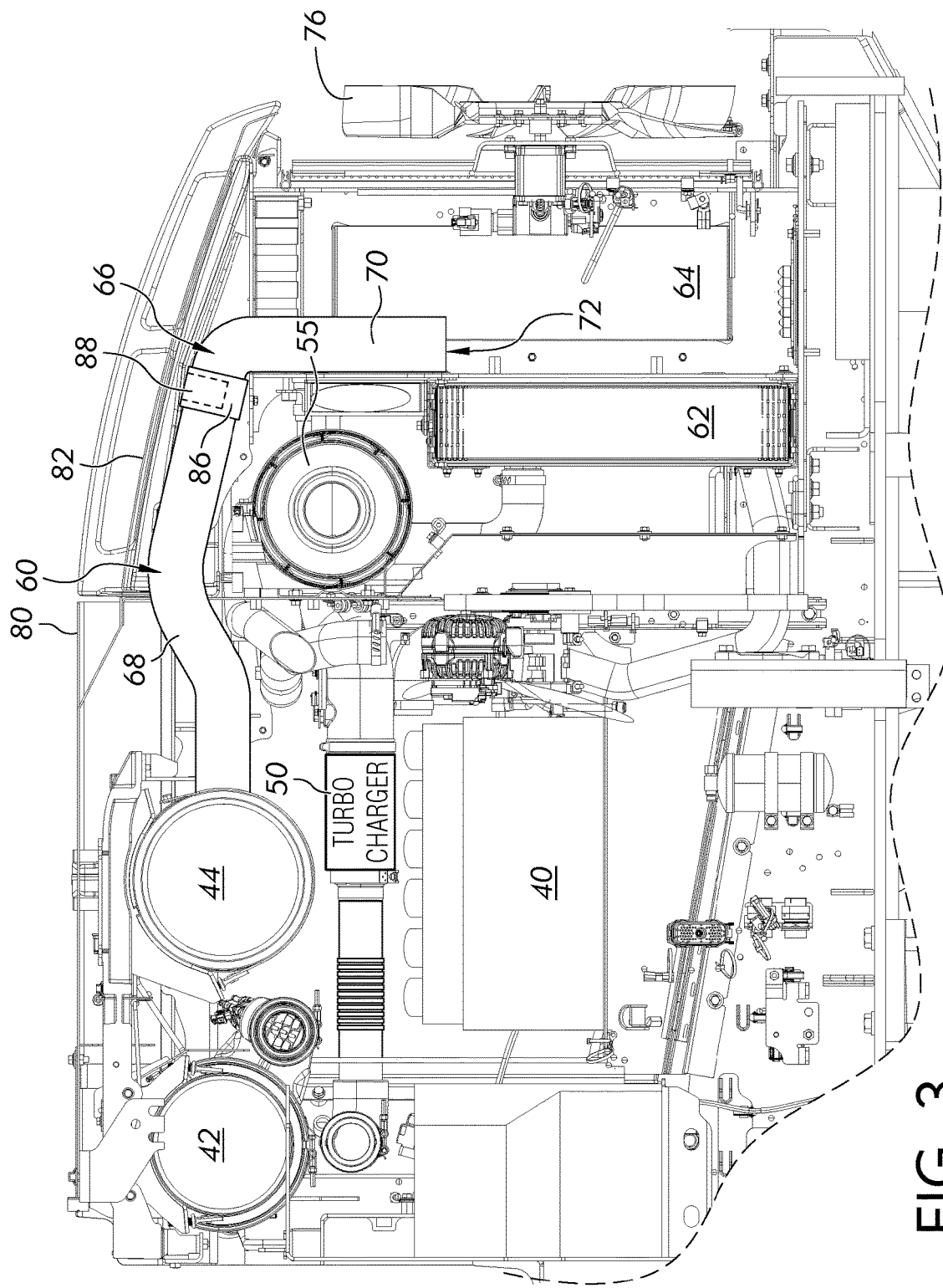
FIG. 3 is a schematic side view of a rear portion of a work machine illustrating a location of an exhaust pipe and other component of an emissions control system and a cooling system.

As illustrated in FIG. 2, the rear body portion 14 includes an engine 40, also known as a prime mover, which in different embodiments is a gasoline powered or diesel powered engine. The engine 40 is connected to and drives a powertrain (not shown), which includes either a manual transmission or an automatic transmission, as is known by those skilled in the art. The present disclosure is not limited to manual and automatic transmission, and other types of transmissions are contemplated including hydrostatic and electric transmissions. The engine 40 provides torque to or absorbs torque from the powertrain, which in turn is used to drive the wheels 16 and/or 20 as illustrated in FIG. 1.

The engine 40 is part of an engine system including, in one or more embodiments, an integrated emissions control system including one or more emission control devices having but not limited to: a selective catalytic reduction (SCR) device, a diesel oxidation catalyst (DOC) device, a diesel particulate filter (DPF) device, and a cooled exhaust gas recirculation (EGR) device as is understood by those skilled in the art.

In the illustrated embodiment of FIGS. 2, 3, 4 and 5, the integrated emissions control system includes a first canister 42 and a second canister 44 fluidly connected to the first canister by a pipe 46 to provide for exhaust gas flow from the first canister 42 to the second canister 44. In FIG. 2, the first canister 42 is hidden from view by a housing 48. In one or more embodiments, a turbocharger 50 is coupled to a pipe 52 and receives fresh air from an air inlet 54 (See FIG. 4). An air filter 55 is coupled to the air inlet 54. The turbocharger 50 is coupled to the first canister 42 through a pipe 56. Fresh air enters the air filter inlet 54, to the filter 55, and proceeds to the turbocharger 50. In other embodiments, a turbocharger is not included and a direct connection from the air filter 55 is made to the engine 40. In a further embodiment, a turbocharger is not included and a direct connection from the engine 40 to the first canister 42 is made. While the described embodiments illustrate a first canister 42 and a separate second canister 44, in other embodiments, the first and second canisters 42 and 44 are combined in a single unitary exhaust system device.

Engine exhaust, which is at high temperature, is moved through the turbocharger 50 or directly from the engine 40, after which the harmful compounds are reduced or eliminated from the exhaust for release into the atmosphere. In some instances, the temperature of the exhaust gas is between five hundred (500) degrees and six hundred (600) degrees Centigrade. The second canister 44 provides for the final reduction or elimination of harmful compounds by the use of selective catalytic reduction which, in one or more embodiments, includes the use of diesel exhaust fluid (DEF). Once "cleaned", the exhaust is directed to the atmosphere through a conduit or pipe 60 operatively connected to an outlet of the second canister 44. The cleaned exhaust gas is, however, still at a relatively high temperature. To reduce the temperature of the exhaust gas, the pipe 60 includes a length sufficient to direct exhaust gas into a space 63 or cavity adjacent to a radiator 62 and an oil cooler 64. (See FIG. 4).

Figure 4:
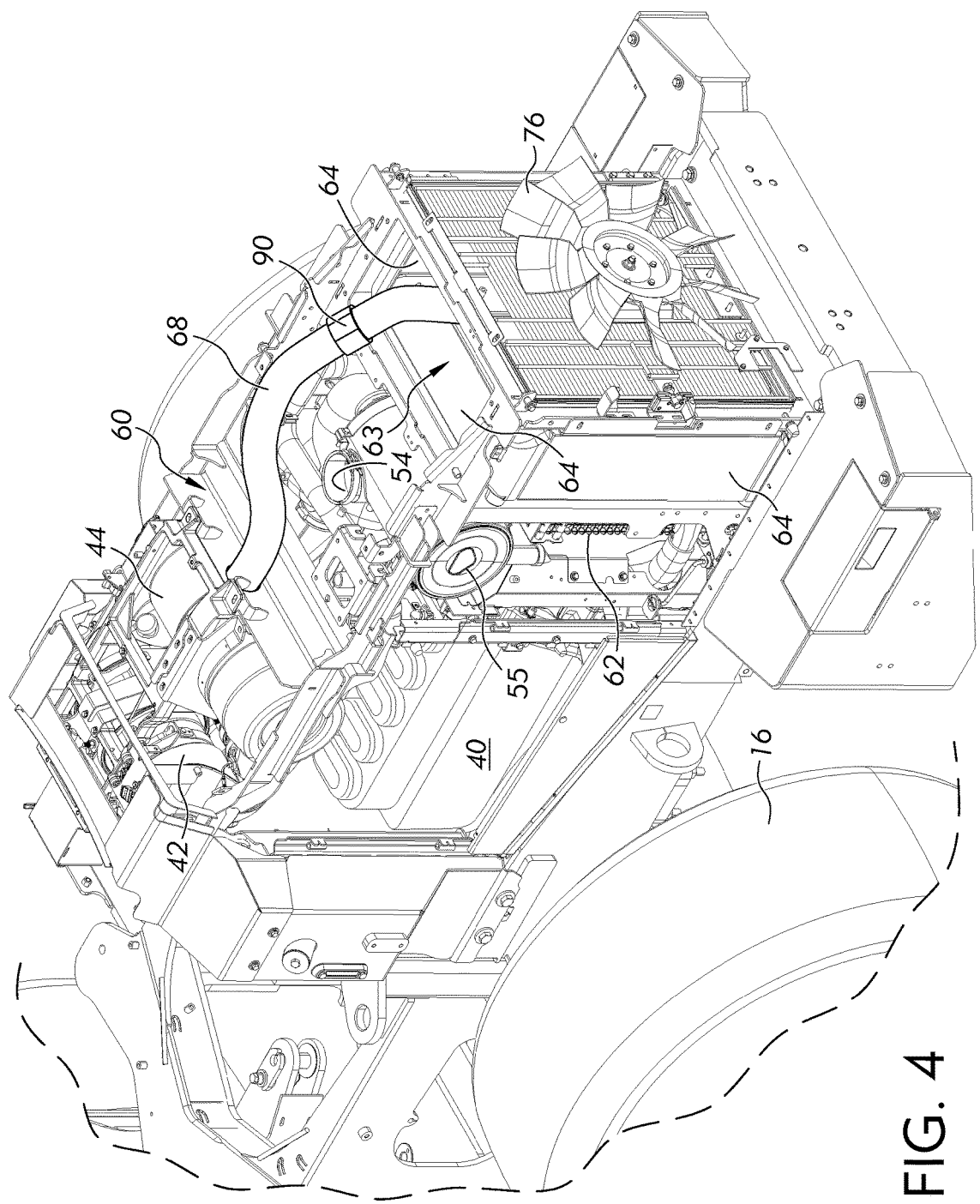
FIG. 4 is a perspective view of a rear portion of a work machine illustrating a location of an exhaust pipe, an emissions control system and a cooling system.

In one or more embodiments, the radiator 62 and oil cooler 64 are arranged in a configuration such that the space 63 is located between the radiator 62 and the oil cooler 64, which includes a one or more upstanding heat exchangers such as illustrated in FIG. 4. The radiator 62 cools an engine coolant circulating through the engine as understood by one skilled in the art. The oil cooler 64 is included as part of the hydraulic system. The pipe 60 includes a bend or angled portion 66 which directs the exhaust gas from a portion 68 extending from the second canister 44 to a relatively vertical portion 70 of the pipe 60. The vertical portion 70 includes an outlet 72 where the cleaned exhaust exits.

The outlet 72 extends into the space 63 for directing the cleaned exhaust from the outlet 72 to an air displacement device such as a fan 76. The fan 76 rotates in a predetermined direction to draw the exhaust from the outlet 72 through the space 63 to direct the exhaust to the atmosphere. In the illustrated embodiment, the exhaust is introduced downstream of the heat exchangers and upstream of the fan 76. In other embodiments, the exhaust is introduced downstream of the fan 76.

By directing the exhaust to the space 63, the cooling system is utilized to extract the engine exhaust from the vehicle 10, without the use of a traditional exhaust stack. In one known system, the exhaust stack includes a tubular exhaust stack with a venturi nozzle to draw fresh air from the engine compartment into the exhaust airflow cooling the air in the process. The known exhaust stack extends in a vertical direction away from the vehicle.

In the present disclosure, the engine exhaust exits the engine 40 and enters the aftertreatment system (or a muffler if used) through the use of conventional piping strategies. The exhaust then exits the aftertreatment system (or muffler) and enters the exhaust pipe 60 where it is routed to the rear of the machine where the cooling package is located. The engine exhaust is, therefore, introduced to the cooling system airflow upstream of the cooling fan 76. The introduction of the engine exhaust to the cooling airflow lowers the exhaust temperature and extracts the exhaust from the machine through the outlet of the cooling system. In another embodiment, air is introduced downstream of the fan. The introduction of the exhaust downstream of the fan maintains the efficiency of the cooling airflow fan and to provide for increased fan durability. Lower temperature air is more dense and has a higher mass flowrate that higher temperature air. This leads to more heat exchange from the higher airflow. Fan durability is improved, since fan components are subjected to a more consistent temperature of air flow, thereby reducing thermal cycling of fan components. Thus higher thermal strains are reduced.

The pipe 60 is located beneath the housing 15 and in particular beneath a hood 80 which is a part of the rear body portion 14. The hood 80 includes a plurality of vents 82 which enables the air inlet 54 to receive fresh air for the turbocharger 50. As can be seen in FIG. 4, the pipe 60 follows a path from the second canister 44 to the space 63 which avoids obstruction of the air inlet 54.

Figure 5:
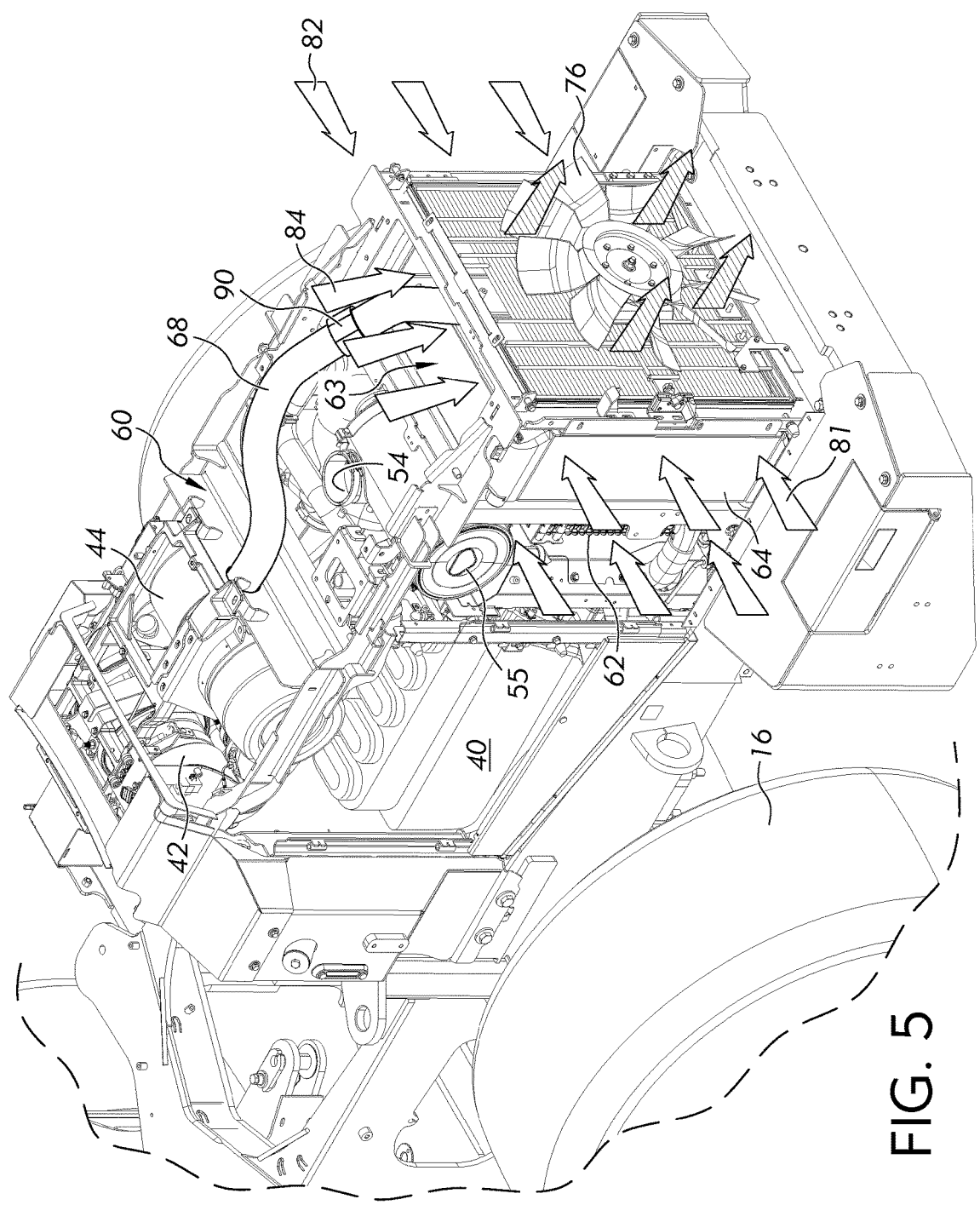
FIG. 5 is a perspective view of a rear portion of a work machine illustrating air flow through a cooling system of a rear portion.

As further illustrated in FIG. 5, airflow direction is indicated by a set of arrows indicating airflow into the rear body portion 14. The housing is removed for purposes of illustration. A first air intake 81 is located on a first vertical side of the rear body portion 14 and a second air intake 82 is located on a second vertical side of the rear body portion 14. A third air intake 84 is located on a top horizontal side of the rear body portion. Since the air flow received into the cooling system starts externally to the vehicle 10, the exhaust gas entering the space 63 is provided with additional cooling before it is drawn by the fan 76 and expelled into the atmosphere. Air is drawn by the fan 76 through each of the radiator 62 and the cooler 64. This configuration provides advantages over the known exhaust stack where cooling of the exhaust does not occur, or is minimal. In addition, the routing of the exhaust pipe 60 improves visibility of the operator of the vehicle as well as enhances the product design configuration of the hood 80. In addition, current exhaust configurations use a venturi to cool the exhaust gas before entering the atmosphere, but the amount of cooling in a venturi system is significantly less than the cooling provide by the described embodiments.

As described above, the exhaust pipe 60 includes the extending portion 68 coupled to the relatively vertical portion 70. In one embodiment, the portion 68 is fixed in position with respect to the vertical portion by having a continuous pipe bent at the angle portion 66. In another embodiment, a connector fixedly couples the portion 68 to the vertical portion 70.

As illustrated in FIGS. 2-5, the vertical portion 70 is coupled to the portion 68 by a connector 86 that includes, in one embodiment, a diverter 88 (see FIG. 3) located within the connector 86. The diverter 88 is located adjacently to an aperture 90 (see FIGS. 4 and 5). In one position of the diverter 88, the aperture 90 is closed and the exhaust gas flows from the second canister 44 to the outlet 72 to be withdrawn by the fan. In a second position of the diverter 88, the aperture 90 is open and the diverter, which previously blocked the aperture 90, is positioned to block exhaust gas from flowing into the vertical portion 70.

The diverter 88 is provided in a cooling system in which the fan 76 is reversible A reversing fan system is provided, in some embodiments, to improve the performance of the engine, such as by clearing the radiator of debris. The reversible fan can also be used to reduce or prevent overcooling of the engine. If the reversible fan is directed to blow air into the oil cooler or radiator, the diverter 88 is position to block the exhaust from entering the space 63.

In other embodiments, the diverter 88 includes other devices to redirect the flow of exhaust from the pipe 60 before the exhaust reaches the outlet 72, such as through the aperture 90. In one embodiment, a diverter includes a valve located in the exhaust system, for instance in the second canister 44. In another embodiment, the diverter 88 includes a valve located at the connector 86. In still other embodiments, the diverter includes an air flow operated vane or aerodynamic wedge actuated by the cooling system airflow. In one or more embodiments, the position of the diverter is adjusted by an electronic or hydraulic control system that actuates the diverter to a predetermined location based on the rotating direction of the blade of the fan 76. In still another embodiment, the connector 86 is rotatable such that the vertical portion 70 is configured to be moved from the illustrated vertical position to another position, such as horizontal, to redirect the flow of exhaust. The position of the vertical portion 90 is adjusted either manually by the operator or by an actuator, such as a motor, a hydraulic cylinder, or other drive mechanisms.

While embodiments incorporating the principles of the present disclosure have been described hereinabove, the present disclosure is not limited to the described embodiments. For instance, while the oil cooler 64 includes multiple heat exchangers defining the space 63 with the radiator 62, other configurations of radiators and oil coolers are contemplated. In one or more embodiments, the exhaust is directed to a location between the fan and the radiators and/or oil cooler to mix the air pulled through the radiators and/or oil cooler with the exhaust. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A work machine including an implement and a hydraulic system configured to power the implement, the work machine comprising:
   an engine configured to provide power and to generate an exhaust as a result thereof;
   an oil cooling system configured to cool an oil of the hydraulic system, the oil cooling system including an oil cooler;
   an engine cooling system configured to cool an engine coolant circulating through the engine, the engine cooling system including a radiator, wherein the radiator is located next to and separated from the oil cooler by a space;
   an exhaust system operatively connected to the engine, the exhaust system configured to reduce contaminants located in the exhaust, the exhaust system including an exhaust pipe configured to direct the exhaust, wherein the exhaust pipe is located within the space and between the oil cooler and the radiator to direct exhaust into the space; and an air displacement device configured to draw air into and away from one of the oil cooler and the radiator and to draw the exhaust from the exhaust pipe and through one of the oil cooler and the radiator, wherein the exhaust pipe directs the exhaust upstream of the air displacement device.

2. The work machine of claim 1 wherein the radiator includes an upstanding radiator.

3. The work machine of claim 2 wherein the oil cooler includes an upstanding oil cooler.

4. The work machine of claim 3 wherein the upstanding oil cooler is located adjacent to the upstanding radiator to define the space therebetween.

5. The work machine of claim 4 wherein the exhaust pipe includes an outlet located in the space between the upstanding oil cooler and the upstanding radiator.

6. The work machine of claim 5 wherein the air displacement device includes a fan.

7. The work machine of claim 1 further comprising a diverter operatively connected to the exhaust pipe, wherein the diverter is configured to direct exhaust away from the air displacement device.

8. The work machine of claim 7 wherein the exhaust pipe includes an outlet located adjacent to one of the oil cooler and the radiator and an aperture spaced from the outlet, wherein the diverter directs exhaust toward the aperture.

9. The work machine of claim 8, wherein the diverter includes one of a valve and an air flow operated vane.

10. An emission control system for an off-road vehicle including a cooling system the emission control system comprising:

an emission control device configured to reduce contaminants from an engine exhaust, the emission control device including at least one of a selective catalytic reduction device, a diesel oxidation catalyst device, a diesel particulate filter device, and a cooled exhaust gas recirculation device; and an exhaust pipe operatively connected to and extending from the emission control device configured to direct exhaust to the cooling system of the vehicle, wherein the cooling system includes an engine cooling system having a radiator and an oil cooling system having an oil cooler, wherein the exhaust pipe includes an outlet located adjacent to one of the oil cooling system and the engine cooling system, wherein the cooling system includes an air displacement device disposed adjacently to one of the oil cooler and the radiator, wherein the outlet is upstream of the air displacement device and located in a space between the oil cooler and the radiator, and wherein the air displacement device is configured to draw air past the oil cooler and the radiator and to draw exhaust from the outlet of the exhaust pipe.

11. The emission control system of claim 10 wherein the air displacement device includes a fan.

12. The emission control device of claim 10 further comprising a diverter operatively connected to the exhaust pipe, wherein the diverter is configured to direct exhaust away from the air displacement device.

13. The emission control device of claim 12 wherein the exhaust pipe includes an aperture spaced from the outlet, wherein diverter directs exhaust toward the aperture.

14. The emission control device of claim 13, wherein the diverter includes one of a valve and an air flow operated vane.

15. A method of cooling engine exhaust generated by an engine of a work machine having a hydraulically operated implement, the method comprising:

cooling an oil used by the hydraulically operated implement with an oil cooler;

cooling an engine coolant circulating through the engine with a radiator;

directing the engine exhaust into a space located between the oil cooler and the radiator, wherein the space is defined within a housing of the work machine in which the radiator and oil cooler are located; and drawing the engine exhaust away from one of the oil cooler and the radiator with an air displacement device.

16. The method of claim 15 wherein the directing step further comprises directing the engine exhaust adjacent to one of the oil cooler and the radiator with an exhaust pipe having an outlet disposed in a space located between the oil cooler and the radiator.

17. The method of claim 16 wherein the directing step further comprises directing the engine exhaust through the outlet, wherein the outlet is located upstream of the air displacement device.

18. The method of claim 15 wherein the directing step further comprises directing the engine exhaust through a channel defined by one of the oil cooler and the radiator with an exhaust pipe having an outlet disposed adjacent to the channel.

19. The method of claim 15 wherein the wherein the directing step further comprises directing the engine exhaust adjacent to one of the oil cooler and the radiator with an exhaust diverter operatively connected to the exhaust pipe.

* * * * *